United States Patent [19]

Schilling

[11] Patent Number: 5,340,280

[45] Date of Patent: Aug. 23, 1994

[54] DOVETAIL ATTACHMENT FOR COMPOSITE BLADE AND METHOD FOR MAKING

[75] Inventor: Jan C. Schilling, Middletown, Ohio

[73] Assignee: General Electric Company, Cincinnati, Ohio

[21] Appl. No.: 154,145

[22] Filed: Nov. 17, 1993

Related U.S. Application Data

[63] Continuation of Ser. No. 55,942, Apr. 30, 1993, abandoned, which is a continuation of Ser. No. 767,336, Sep. 30, 1991, abandoned.

[51] Int. Cl.⁵ .................................................. F01D 5/14
[52] U.S. Cl. ............................. 416/229 A; 416/219 R; 416/226; 416/230
[58] Field of Search ............... 416/217, 219 R, 219 A, 416/226, 229 R, 229 A, 230

[56] References Cited

U.S. PATENT DOCUMENTS

| | | |
|---|---|---|
| 2,175,204 | 10/1939 | Lougheed . |
| 2,929,755 | 3/1960 | Porter . |
| 3,004,607 | 10/1961 | Linnaberry et al. . |
| 3,018,832 | 1/1962 | Prewitt . |
| 3,055,437 | 9/1962 | Stack . |
| 3,132,841 | 5/1964 | Wilder, Jr. . |
| 3,215,512 | 11/1965 | Coad . |
| 3,321,019 | 5/1967 | Dmitroff et al. . |
| 3,476,484 | 11/1969 | Brunsch ..................... 416/230 |
| 3,694,104 | 9/1972 | Erwin ........................ 416/226 |
| 3,737,250 | 6/1973 | Pilpel et al. ................ 416/219 |
| 3,950,115 | 4/1976 | Euler ......................... 416/226 |
| 4,040,770 | 8/1977 | Carlson ....................... 416/230 |
| 4,098,559 | 7/1978 | Price ......................... 416/230 |
| 4,268,571 | 5/1981 | McCarthy ...................... 428/236 |
| 4,626,173 | 12/1986 | Mouille et al. ............. 416/134 |
| 4,810,167 | 3/1989 | Spoltman et al. ......... 416/229 AX |
| 4,929,154 | 5/1990 | Wildner ................... 416/229 AX |
| 4,966,527 | 10/1990 | Merz ....................... 416/230 X |
| 4,995,788 | 2/1991 | Turnberg ................... 416/230 X |
| 5,049,036 | 9/1991 | Bailey et al. ................ 416/230 |
| 5,102,302 | 4/1992 | Schilling et al. ............. 416/224 |
| 5,165,856 | 11/1992 | Schilling et al. ............. 416/204 |

*Primary Examiner*—Edward Look
*Assistant Examiner*—Michael S. Lee
*Attorney, Agent, or Firm*—Jerome C. Squillaro; Bernard E. Shay

[57] ABSTRACT

A fan blade and/or propeller blade such as found in a gas turbine engine having a dovetail former having sections of composite unidirectional wrap material wrapped about the dovetail former from the concave to the convex side of the airfoil and filling cutout spaces between dovetail sections. Layers of non-wrapped composite material are cut and tapered and attached to the front and back sides of the dovetail sections.

4 Claims, 3 Drawing Sheets

DOVETAIL ATTACHMENT FOR COMPOSITE BLADE AND METHOD FOR MAKING

This application is a continuation of application Ser. No. 08/055,942, now abandoned, filed Apr. 30, 1993 which is a continuation of application Ser. No. 07/767,336, now abandoned filed Sept. 30, 1991.

BACKGROUND OF THE INVENTION

The present invention relates to fan blades for gas turbine engines of the type referred to as turbofan engines. More particularly, the present invention relates to a composite blade having a skin transitioned to a metal semi-spar in such a manner that skin retention is not dependent on bond integrity, the composite blade of the present invention having a metal dovetail attachment incorporated into the blade.

A rotating blade, particularly one rotating at high speed, is subject to a number of forces which result in the blade experiencing bending stresses, tensile stresses, and torsional stresses. As an airplane moves through the air, the blades produce a thrust force caused by the airfoils producing lift as they rotate in a plane normal to the air inlet direction. This thrust force produces both bending stress and torque in the blades. A centrifugal force is created as a result of the rotation of the fan or propeller. This centrifugal force causes tensile stresses in the blade. Notwithstanding the strength requirements of such blades, it is further desirable to minimize the weight of such blades in order to reduce the overall weight of the engine.

It is known to produce blades for aircraft engines from composite materials such as, for example, graphite or boron or glass fibers or any combination thereof, in order to optimize the strength and weight requirements. However, it is believed that one of the critical areas of such blades is the point of attachment between the blade and hub assembly. In particular, in certain applications it is believed that the attachment requires a monolithic metal structure incorporated in the blade to support attachment. In a large turbofan engine, a dovetail attachment has proven to be an effective device for use as a load transition of a blade to a hub or disk and has been used on rotating blades of various styles and configurations since the invention of turbomachinery.

FIG. 1 illustrates a typical dovetail attachment, with the dovetail portion 2 of the fan blade 3 being secured to the disk 4 at dovetail to disk post interface 5. The dovetail portion 2 fits between disk posts 6 by sliding the blade 3 into disk 4.

Experience has shown that composite blades can be manufactured to meet virtually all requirements except those of adequate attachment transition. Since a composite blade is a collection of unidirectional fiber material, loading normal to the fiber is essentially limited to a matrix resin system. Since virtually all resins can withstand a limited amount of compression, very large surface areas are required for load distribution considerations if a dovetail configuration of composite material is desired. Such attachments have been conceived and tested over the past twenty years, but none have proven to have the durability to afford extended service. Experience has shown that a monolithic metal attachment is the only attachment proven to provide desired durability.

Thus, a composite blade having a metallic attachment has been the industry choice. This combination requires the composite to be bonded to the metal, i.e., a spar-shell design. FIGS. 2A and 2B illustrate a typical composite blade 6 having a shear area 8 which experiences shell to spar load. The blade spar 10 interfaces with the shell 14 made of composite plies at the shear surface 12.

Large areas of spar are required in order to transition the airfoil unidirectional load from the composite skin to the spar. A large area of spar results in much weight and machining cost being added to the process of manufacturing a composite blade. To prevent disbonding from age, impact, or manufacturing tolerances, one approach has been to secure the blade skin to spar by a secondary retentive feature. This securing is accomplished by a series of bolts and/or rivets to assure the skin load is transitioned to the spar. In FIG. 3, blade root 16 has its shell 14 secured to the spar 10 by a plurality of bolts 18 and rivets 20.

In light of the above discussion, it is evident that a need exists for a blade which incorporates a metal dovetail attachment and reduces spar cost, reduces spar area (bond area), and eliminates the need for an added secondary retention feature.

SUMMARY OF THE INVENTION

Accordingly, one object of the present invention is to provide a composite blade whose spar cost is minimized.

Another object of the present invention is to provide a blade which incorporates composite features with a metal dovetail attachment.

Yet another object of the present invention is to provide a blade which eliminates added secondary retention features from its design.

These and other objects of the present invention are achieved by fashioning a blade comprised of a dovetail former; a composite wrap about the dovetail former; and a means for transitioning non wrap fibers to the dovetail former.

The dovetail former of the present invention has a plurality of cutouts interposed between a plurality of metallic dovetail sections. A composite unidirectional fiber material is wrapped from a convex side of the blade airfoil to a concave side of the blade airfoil in a continuous fashion, the composite unidirectional fiber material filling in the plurality of cutouts. This wrap forms a load path direct to the former and does not rely on the shear capability of composite to former.

The present invention provides a means to transition a composite blade skin to a metal semi-spar (dovetail former) so that spar cost is minimized, secondary retention is not dependent on added bolts or rivets, and a metal dovetail attachment is incorporated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings in which.

DETAILED DESCRIPTION OF THE INVENTION

Figure 4:
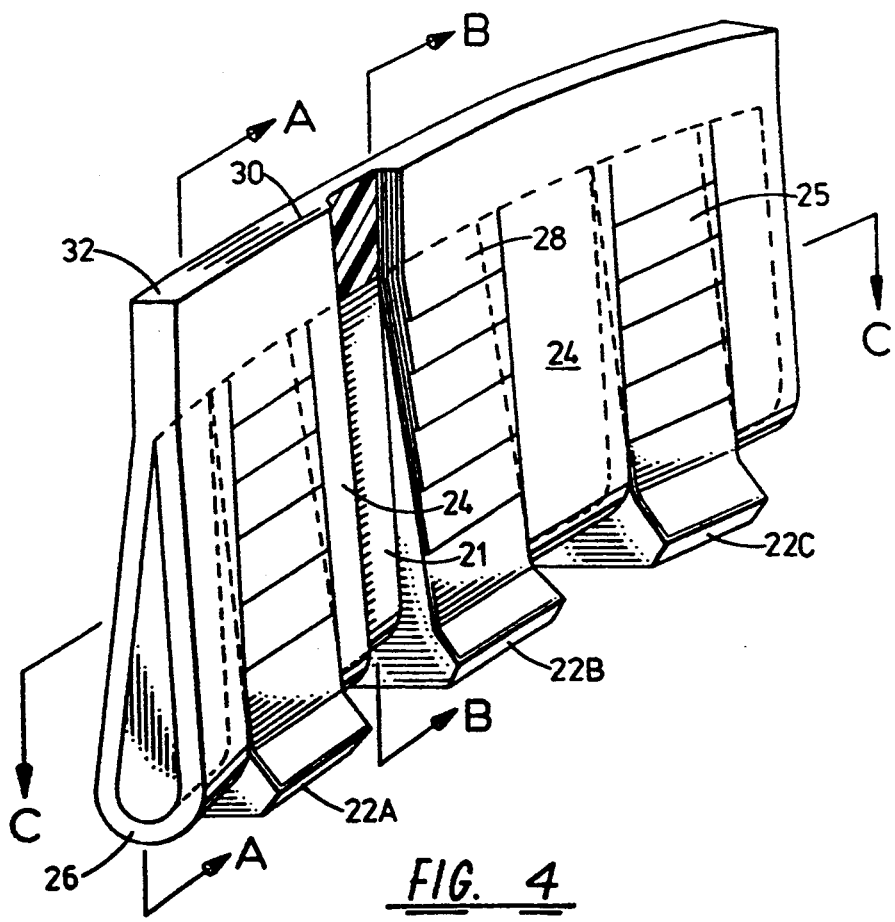
FIG. 4 is a schematic illustration depicting the discrete cutouts of the dovetail former of the present invention.

Referring now to the drawings wherein like reference numerals designate identical or corresponding parts through the respective figures, and more particularly to FIG. 4 thereof, dovetail former 21 is comprised of a plurality of metallic dovetails sections 22. FIG. 4 exhibits three dovetail sections labeled dovetail sections 22A, 22B, and 22C. Different numbers of dovetail sections may, of course, be implemented without deviating from the spirit of the present invention.

The dovetail sections 22 are separated by discrete cutouts 24 which are for the purpose of accommodating unidirectional composite material 26. How composite material 26 is laid and positioned in the dovetail former 21 is discussed subsequently.

The concave side of the airfoil 30 abuts the convex side of the airfoil 32. The concave side of the airfoil is regarded as an airfoil pressure surface and the convex side of the airfoil is an airfoil suction surface.

Each metallic dovetail section 22 separates sections of unidirectional composite material 26 which are laid in layers from the convex side of the airfoil to the concave side. In other words, each metallic dovetail section form is positioned between sections of unidirectional fiber material 26. Between each dovetail section 22 is a cutout 24 (three of which are portrayed in FIG. 4). By filling the cutouts 24 with layers of unidirectional composite material 26 which are laid from the convex side of the airfoil to the concave side of the airfoil, the open space between dovetail sections is filled in.

Each dovetail section such as dovetail sections 22A, 22B, and 22C (FIG. 4) have a front side and a back side. FIG. 4 identifies back side 25 of dovetail section 22C, the front side of dovetail section 22C is not shown but is of course opposite to the back side 25. The back side of dovetail section 22B (FIG. 4) is illustrated as having a plurality of composite plies 28 which are not wrapped around the dovetail section 22B but are tapered in layers to form composite termination locations. The tapered layers are formed by cutting or chopping off the fibers in the respective layers of composite plies so that the layers of composite plies are thicker at the top of each dovetail section 22 than towards the bottom of each dovetail section 22.

Figure 1:
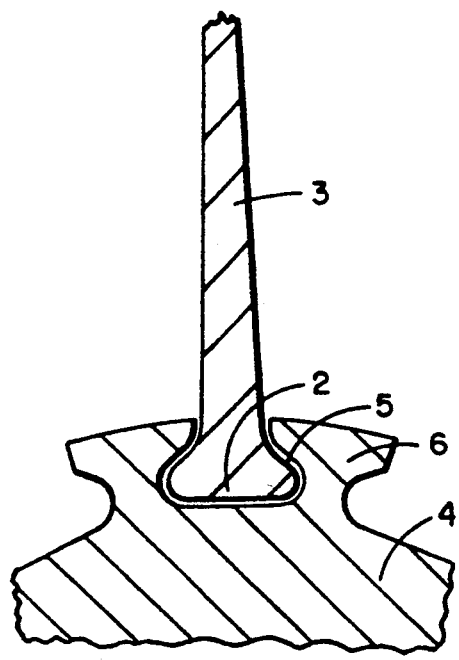
FIG. 1 is a schematic illustration of a prior art dovetail portion of a blade attached to a disk.
Figure 2A:
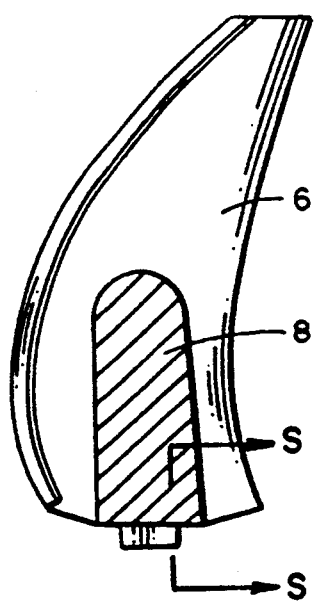
FIG. 2A is a schematic illustration of a prior art blade having a spar/shell design and FIG. 2B is a cross-sectional view of the blade taken along line S—S of FIG. 2A.
Figure 2B:
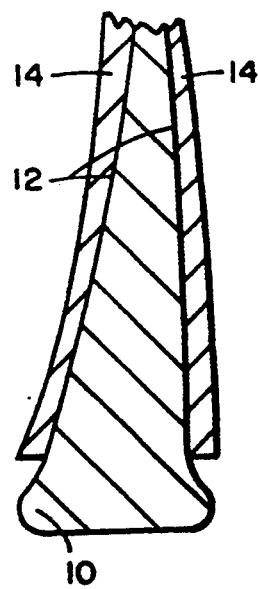
Figure 5:
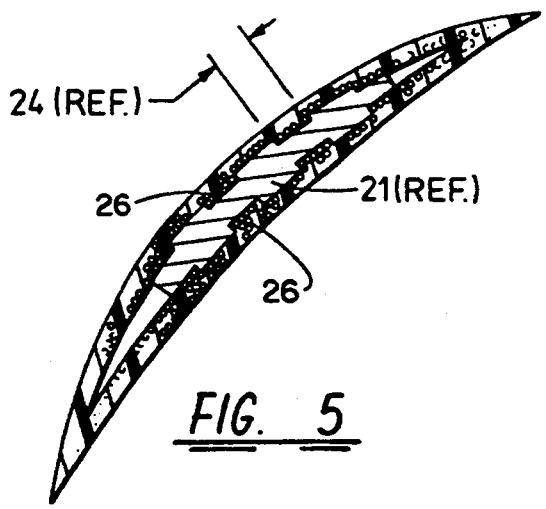
FIG. 5 is a blade chordwise cross-sectional illustration taken along line C—C of FIG. 4.

In FIG. 5, a cross-sectional blade chordwise view taken along line C—C of FIG. 4 shows the presence of composite wrap material 26 at the convex side (i.e., airfoil suction surface 32) and the concave side (i.e., airfoil pressure surface 30) of the dovetail former 21. The composite wrap material 26 fills the cutouts 24 (FIG. 4). The small circles at 26 are intended to schematically represent the unidirectional composite fibers wrapping around the metallic former at cutouts 24 and terminated elsewhere.

Figure 6:
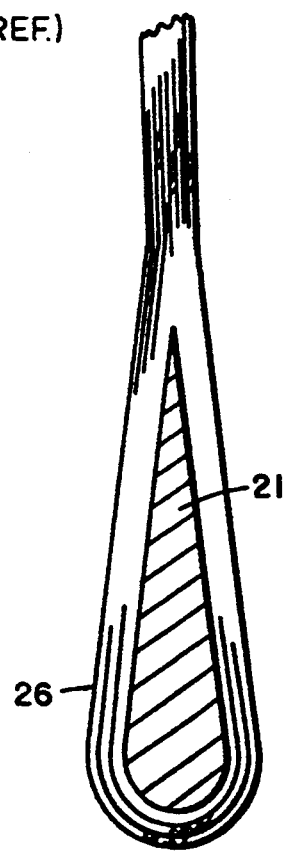
FIG. 6 is a blade spanwise cross-sectional illustration taken along line A—A of FIG. 4 depicting the relationship of the dovetail former, unidirectional composite wrap material laid from the convex to concave side of the airfoil, and composite plies according to the present invention in a cutout area adjacent a dovetail section.
Figure 3:
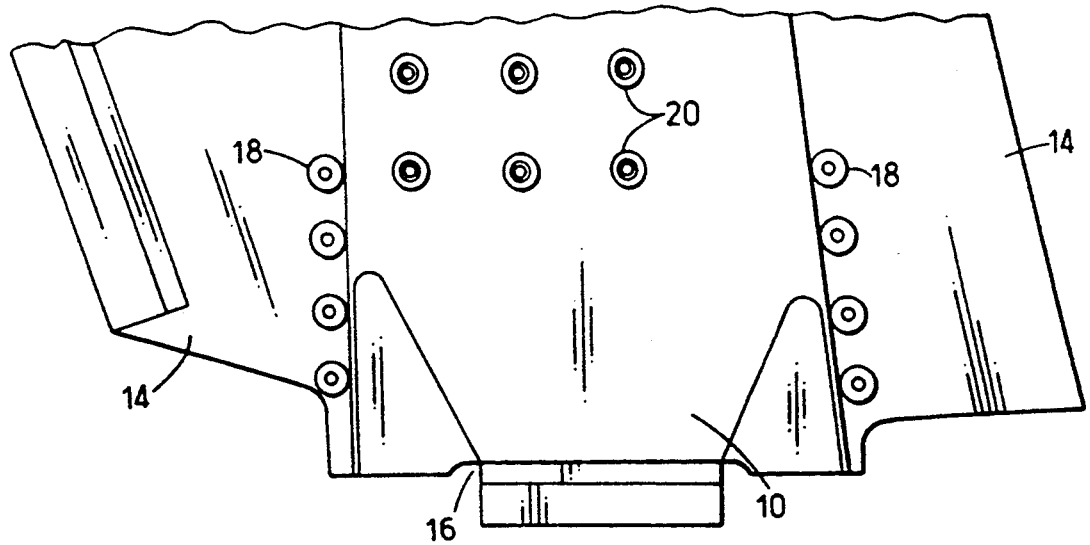
FIG. 3 is a side view illustration of a prior art blade having a series of rivets and bolts to insure the integrity of the blade skin and spar interface.

FIG. 6 is a blade spanwise section taken along fine A—A of FIG. 4 and further serves to illustrate how a composite wrap material 26 is wrapped about the dovetail former 21 in those locations where the dovetail sections are not present e.g., cutout area 24. As has been mentioned, the unidirectional composite material 26 is wrapped around former 21 from the convex side of the airfoil to the concave side of the airfoil.

Figure 7:
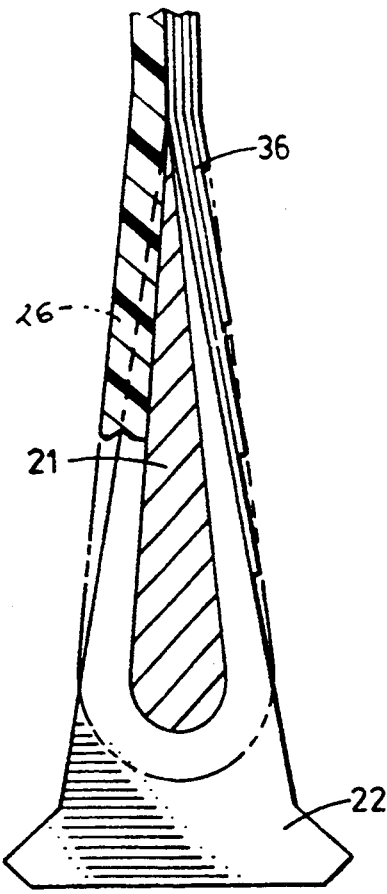
FIG. 7 is a blade spanwise cross-sectional illustration taken along line B—B of FIG. 4, line B—B cutting through a dovetail section, FIG. 7 depicting the relationship of the dovetail load section with the composite ply transition according to the present invention.

FIG. 7 is a blade spanwise section taken along line B—B of FIG. 4. Composite ply termination area 36 comprised of non-wrapped, tapered composite plies 28 (FIG. 4) are represented as being located behind a wrap section 26 which surrounds the dovetail former 21.

Figure 8:
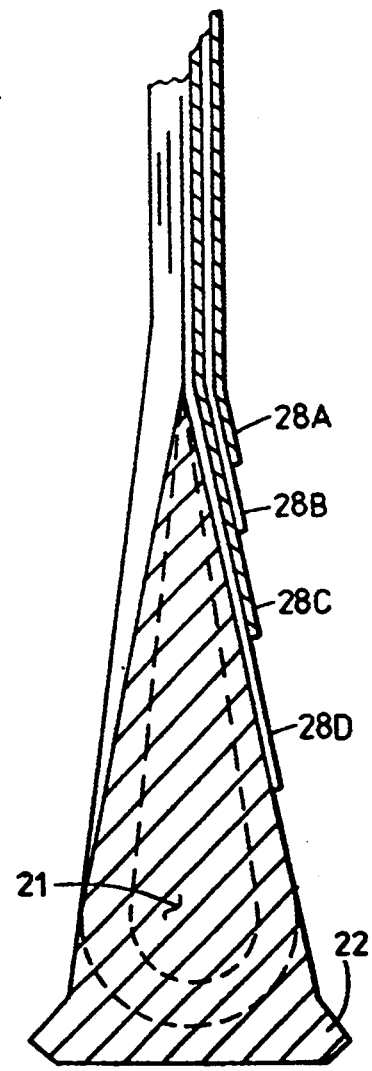
FIG. 8 is a spanwise cross-sectional illustration taken along line B—B of FIG. 4 and schematically demonstrates the ply termination points of the composite plies in the composite ply termination area of the present invention.

FIG. 8 illustrates layers of non-wrapped composite plies 28 of termination area 36. Each layer 28 is usually from 5 to 20 thousandths of an inch thick. The end point of the non-wrapped plies are represented by ply termination points 28A, 28B, 28C, and 28D. Many layers (depending on airfoil size, load, and composite plies used) are cut and tapered to achieve the sloped shape of composite ply termination area 36 (FIG. 7). Dovetail attachment 22 (FIG. 8) is the radially inward portion of dovetail former 21. Dovetail former 21 is made of titanium, steel or other suitable material.

Figure 9A:
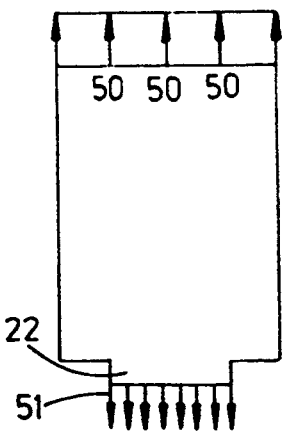
FIG. 9A is a load diagram which depicts how centrifugal load is applied to the composite blade of the present invention as the blade is rotated.
Figure 9B:
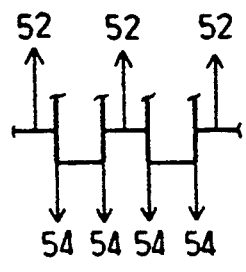
FIG. 9B is a load diagram depicting the load experienced by the unidirectional composite wrap and the reaction load experienced by the dovetail former as a result of wrap-load transition.
Figure 9C:
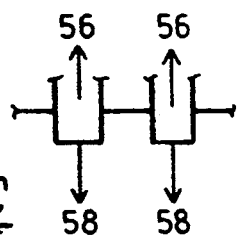
FIG. 9C is a load diagram depicting the load at the shear interaction surface and reaction load at the dovetail former as a result of shear interaction from non-wrap plies.

FIGS. 9A, 9B, and 9C are load diagrams and depict the loads which occur in the composite blade of the present invention during centrifugal loading from engine rotation. In FIG. 9A arrows 50 indicate that a centrifugal load is applied through the airfoil and reacted at the blade attachment by load 51. In FIG. 9B arrows 52 indicate the load at composite wrap section 26 and arrows 54 indicate the reaction load at dovetail section 22 from wrap load transition. In FIG. 9C arrows 56 and 58 represent the load and reaction load from the interaction and reaction of the shear experienced between the non-wrapped plies 28 and the dovetail sections 22. As can be appreciated from the diagrams, the components of the composite blade of the present invention remain in static equilibrium when subjected to high rotation speeds.

Figure 10:
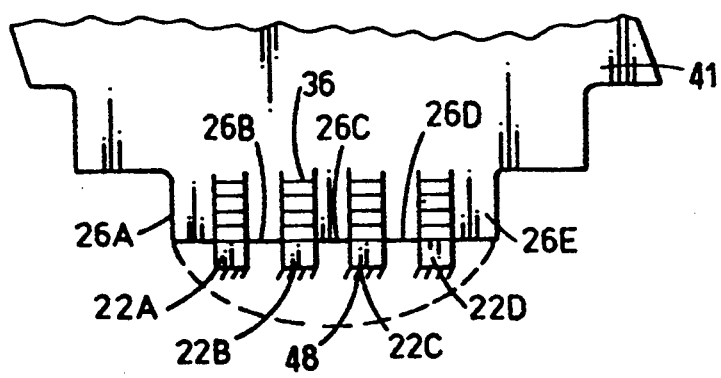
FIG. 10 is a schematic illustration of the dovetail termination points and the composite blade wraps of the present invention.

FIG. 10 further serves to demonstrate how sections of composite material wrapped around the former (i.e., sections 26A, 26B, 26C, 26D, and 26E) between metallic dovetail sections (22A, 22B, 22C, and 22D) react the blade load directly to the dovetail disk post interface without relying upon a total shear bond layer between the composite and spar. Dovetail disk post interface is depicted as point 48. A circular arc dovetail is recommended so that airfoil end effects are minimized, but the concept can be applied to straight dovetails.

Construction techniques for the present invention may be similar to those disclosed in U.S. Pat. application Ser. No. 07/201,232 filed Jun. 22, 1988 and in U.S. Pat. No. 4,784,575, both assigned to the assignee of the present invention.

Numerous modifications and variations of the present invention are possible in light of the above teachings. It is therefore to be understood that the invention may be practiced otherwise than as specifically described herein and still be within the scope of the appended claims.

What is claimed is:

1. A composite blade having an airfoil, said blade comprising:

a dovetail former having a plurality of metallic dovetail sections, said plurality of dovetail sections forming at least one cutout area:

a composite unidirectional fiber material laid from a convex side to a concave side of the airfoil and filling in said at least one cutout;

a plurality of layers of non-wrapped composite plies which are cut and tapered and connected to said plurality of dovetail sections; and said plurality of layers of non-wrapped composite plies being arranged such that said tapered layers are formed by cutting fibers in respective layers such that said layers of composite plies are thicker at the top of said dovetail section, layers closer to said former being longer than layers away from said former.

2. A blade according to claim 1 wherein the composite blade is a fan blade.

3. A blade according to claim 2 wherein the composite blade is a propeller blade.

4. A method of assembling a composite blade, the blade being comprised of a dovetail former having an airfoil section and having at least two dove tail sections which form a cutout space, the cutout space being filled with a section of layered composite wrap material, and non-wrapped composite material being connected to the at least two dovetail sections, the method comprising the steps of:

(a) filling the cutout space with the section of layered composite wrap material and wrapping each layer of composite wrap material from one side of the airfoil to an opposite side the airfoil; and (b) associating the non-wrapped composite material to the at least two dovetail sections and forming layers of non-wrapped composite materi tapered; and (c) cutting said layers of non-wrapped composite material such that said layers of composite material are thicker at the top of said dovetail section layers closer to said former being longer than layers away from said former.

* * * * *